April 15, 1952 R. L. PHIPPS 2,593,341
ROTARY HAND HOE
Filed Feb. 4, 1948 4 Sheets-Sheet 1
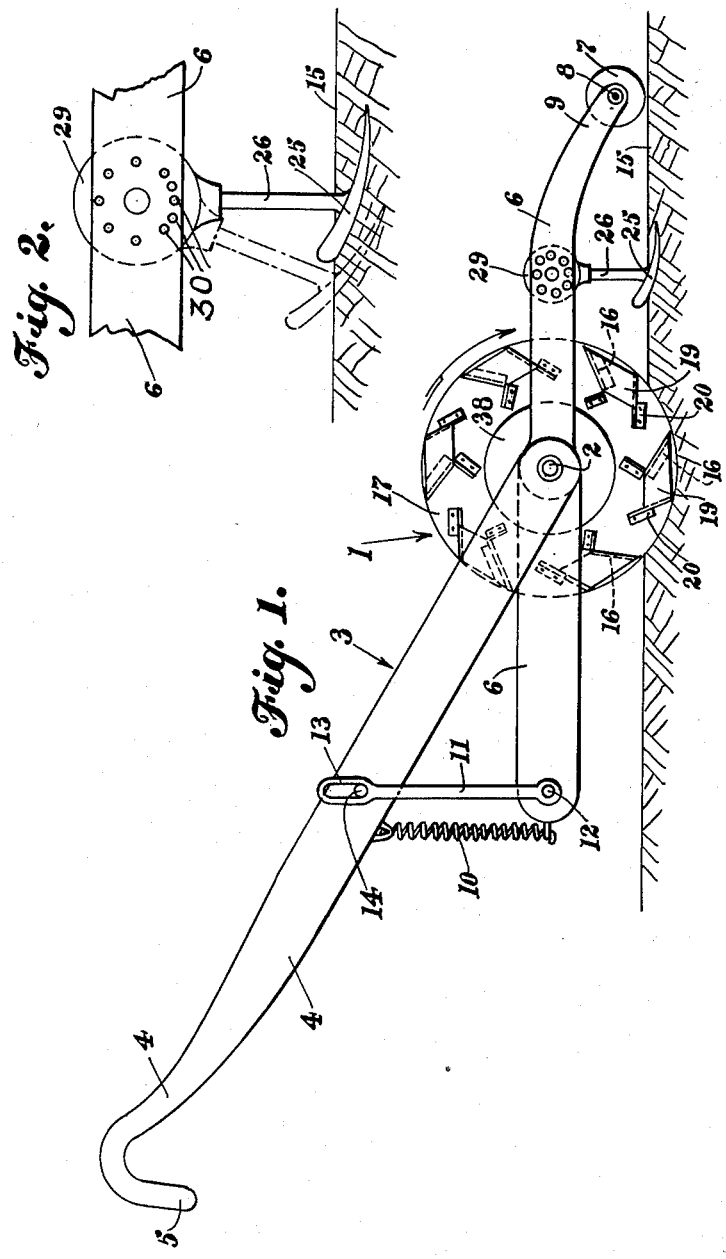
INVENTOR.
BY Ray L. Phipps
Heard Smith & Tennant
Attorneys.

April 15, 1952     R. L. PHIPPS     2,593,341
ROTARY HAND HOE
Filed Feb. 4, 1948     4 Sheets-Sheet 2
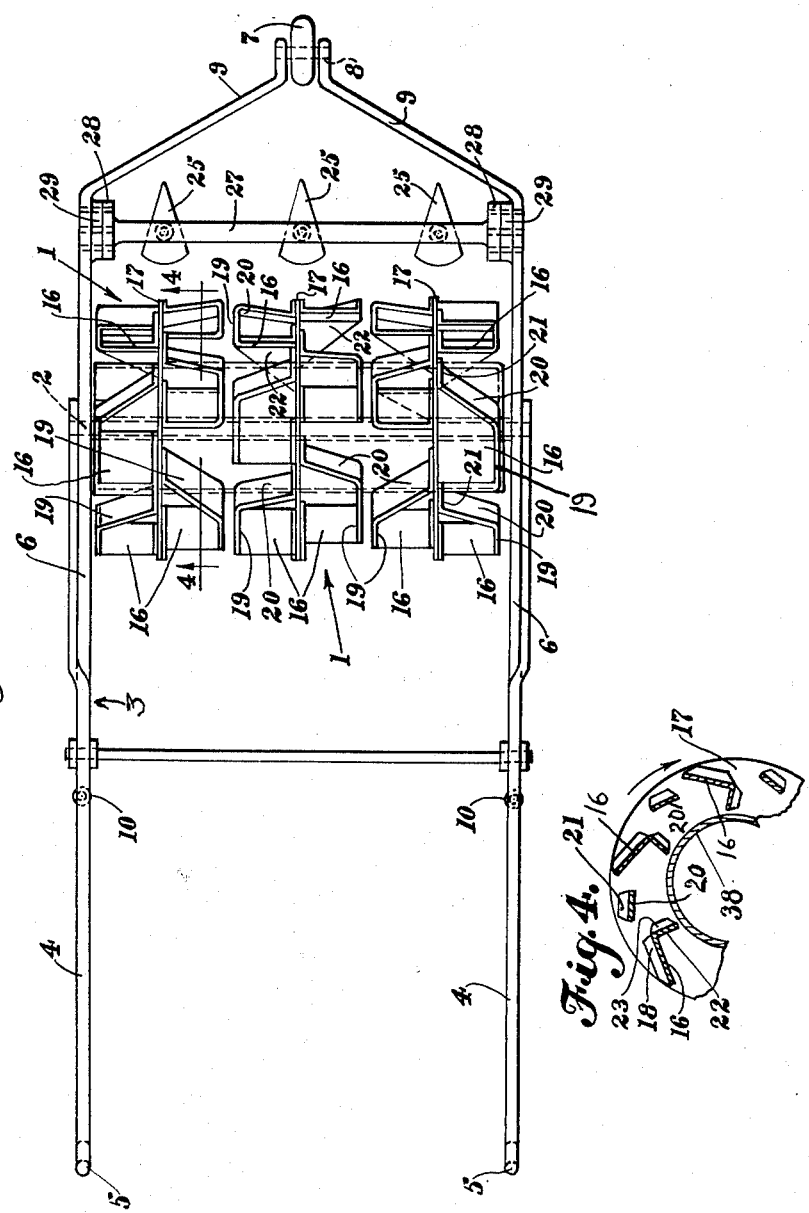
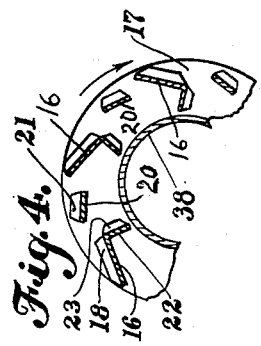
INVENTOR.
Ray L. Phipps
Heard Smith & Tennant
attorneys April 15, 1952

R. L. PHIPPS 2,593,341

ROTARY HAND HOE

Filed Feb. 4, 1948

INVENTOR.

BY Ray L. Phipps
Heard Smith Hermant
Attorneys

April 15, 1952  R. L. PHIPPS  2,593,341
ROTARY HAND HOE
Filed Feb. 4, 1948  4 Sheets-Sheet 4
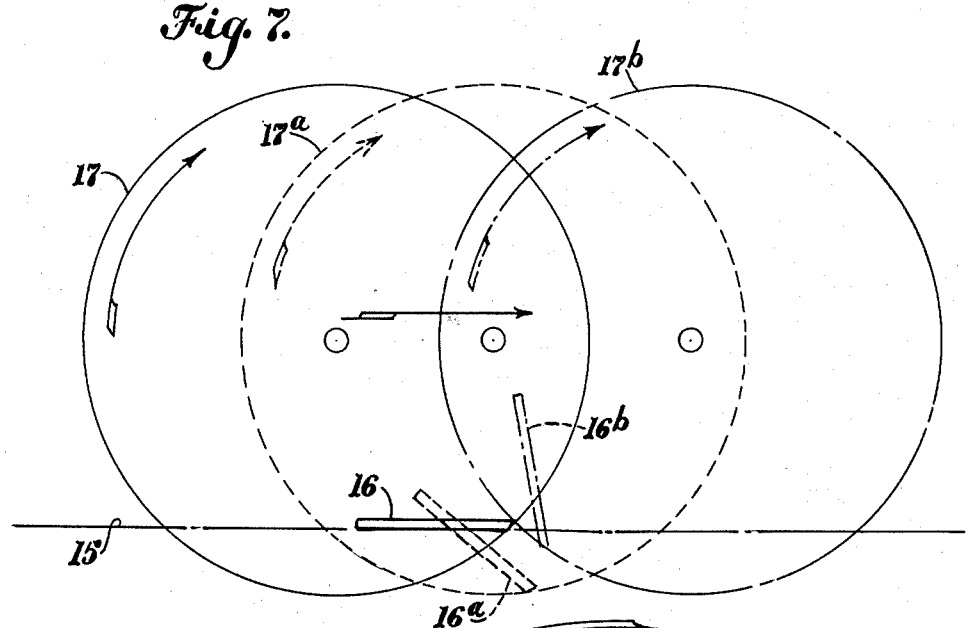
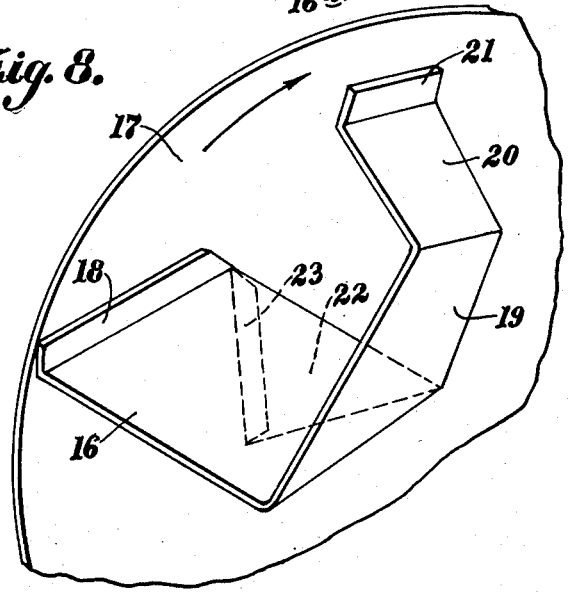
INVENTOR.
BY Ray L. Phipps
Heard Smith Tennant
Attorneys Patented Apr. 15, 1952

2,593,341

UNITED STATES PATENT OFFICE 2,593,341

ROTARY HAND HOE

Ray L. Phipps, Hingham, Mass.

Application February 4, 1948, Serial No. 6,202

3 Claims. (Cl. 97—52)

This invention relates to hand hoes or manually operated cultivator implements, and particularly to that type of hand hoe which embodies a freely rotatable cultivator element that has a rolling movement over the ground to be cultivated when the implement is pushingly propelled forward manually.

One object of the invention is to provide a hand hoe of this type which is very effective in cultivating or stirring the soil but which requires a relatively small amount of power to operate it, thereby providing an implement which can be easily operated by anyone.

Another object of the invention is to provide an implement of this type having a plurality of soil-stirring blades, each of which, when the implement is manually propelled and the rotary cultivator element is given its rolling movement over the ground, is brought into contact with the earth in a substantially flat position and then is tilted forward and simultaneously thrust into the soil, the forward tilting movement being continued while the blade is in the soil and until it reaches a substantially vertical position when it is withdrawn from the soil.

In order to give an understanding of the invention, I have illustrated herein a selected embodiment thereof which will now be described after which the novel features will be pointed out in the appended claims.

In the drawings,

Fig. 1 is a side view of a hand hoe embodying my invention.

Fig. 2 is a fragmentary view showing the weed cutting blades.

Fig. 3 is a top plan view of Fig. 1.

Fig. 4 is a fragmentary sectional view taken on the line 4—4, Fig. 3.

Fig. 7 is a diagrammatic view illustrating the manner in which the soil-stirring blades operate to stir the soil during the rolling motion of the rotatable cultivator element.

Fig. 8 is a fragmentary perspective view of the blade-supporting flange and one of the soil-stirring blades thereon.

Figure 5:
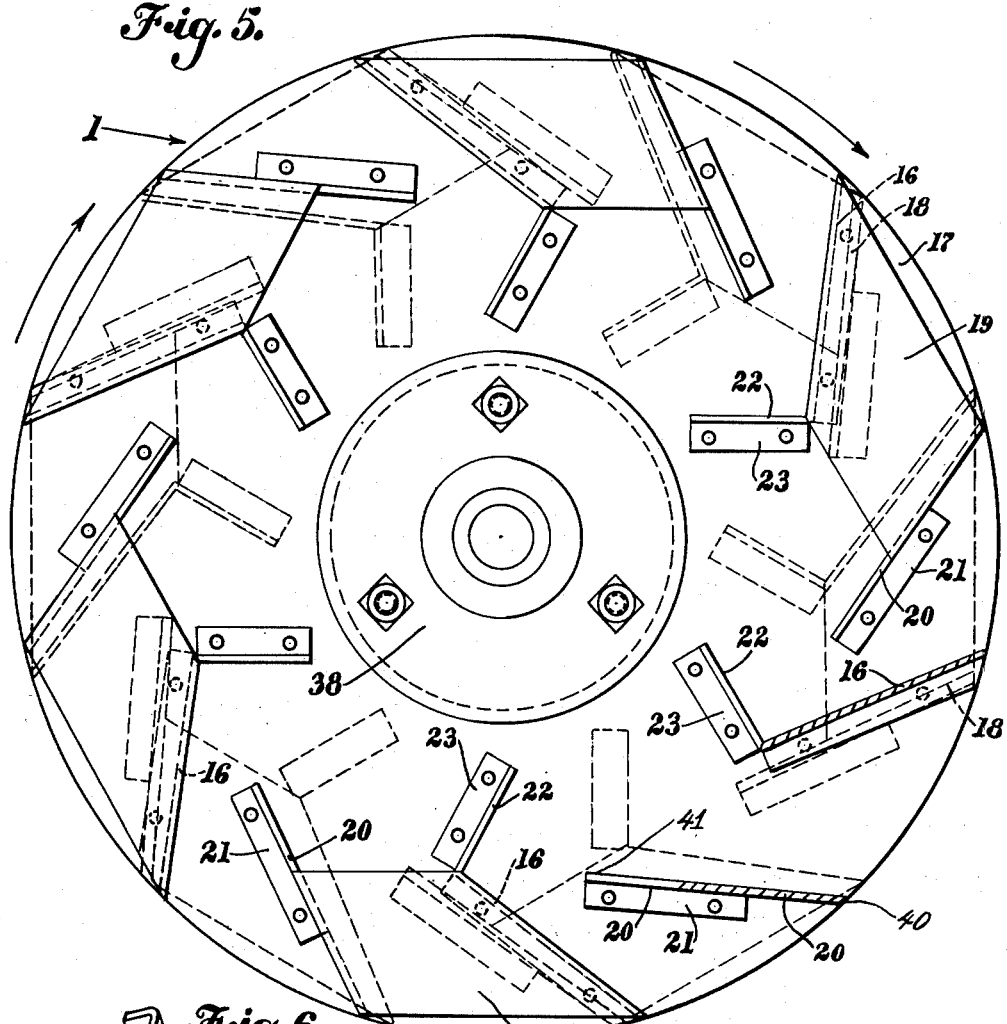
Fig. 5 is an enlarged side view of the rotary cultivator element with parts broken out.

My improved hand hoe comprises a freely rotatable cultivator element indicated generally at 1 which is rotatably mounted on a shaft 2 carried in a frame 3, the latter having handle bars 4 provided with handles 5 to be gripped by the operator. While the frame 3 may have any suitable or usual construction, I have herein shown it as comprising two handle bar members 4 which carry at their lower end the supporting shaft 2 on which the rotary cultivator element 1 is mounted, the latter being located between the handle bar members 4.

The frame also embodies two side bars 6 which are mounted on the ends of the shaft 4 and which extend forwardly beyond the cultivator element and carry at their front ends a guide roll 7 which is mounted on a pin or shaft 8 that is secured in the ends 9 of the side bars.

The side bars 6 also extend rearwardly from the axle 2 and each is connected to the corresponding handle bar by means of a spring 10. The rear end of each side bar 6 also has a link 11 pivoted thereto at 12, and the upper end of each link is provided with a slot 13 in which is received a pin 14 extending from the handle bar 4.

The springs 10 maintain the guide roll 7 in yielding contact with the earth 15, and the pin and slot connection between the links 11 and the handle bars 4 provide for a limited turning movement of the side bars 6 about the axle 2 relative to the handle bars 4.

As stated above the cultivator element 1 is freely rotatable on its shaft 2, and when the implement is pushed forward over the soil 15, the rotary cultivator element 1 will have a rolling contact with the soil.

Said cultivator element 1 is provided with a plurality of soil-stirring blades each of which occupies a plane substantially parallel to its axis of rotation but has an angle to a radial line drawn through said blade. Said soil-stirring blades are indicated at 16, and while they may be supported in various ways, they are herein illustrated as being mounted on blade-supporting disks or flanges 17 which are carried by and associated with a central drum-like element 38 that in turn is mounted for rotation on the shaft 2. The cultivator element may be provided with any number of these radial flanges or disks 17, three being illustrated in the present embodiment of the invention.

Each blade-supporting disk or flange 17 preferably has a plurality of soil-stirring blades 16 mounted on each side thereof and extending at right angles thereto.

Each soil-stirring blade 16 occupies a plane parallel to or spaced from the axis 2 of the rotary element, and each blade has a relatively broad leading edge 40 which occupies said plane and which is situated adjacent the periphery of the rotary element. The location of each blade 16 relative to the axis 2 of the rotary element is such that said blade makes an angle of less than 90° with a radial line extending through its leading edge 40, and greater than 90° with another radial line extending through its trailing edge 41.

It will be noted that taking into consideration the direction in which each blade-supporting member is rotated during the normal operative forward movement of the cultivator implement, the radial line extending through the trailing edge of each blade will be in advance of the radial line extending through the leading edge of said blade. The advantage of this construction will be hereinafter referred to.

Such blades may be provided for in various ways, and in the construction herein shown each blade 16 is made from sheet metal which is secured at its inner side edge to one of the blade-supporting flanges 17. This may be accomplished by bending the edge portion 18 of the blade at right angles and riveting or spot welding it to the side of the flange 17.

Figure 6:
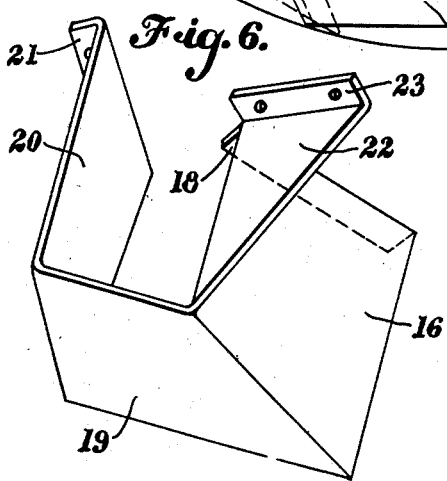
Fig. 6 is a perspective view of one of the main soil-stirring blades and its associated bracing element.

To provide a proper support or brace for the outer edge of each blade 16 the latter has formed integral therewith a side member 19 which in turn has integral therewith a bracing section 20, the latter extending inwardly to the disk and having its edge 21 bent at right angles to the body of the bracing section and riveted or spot welded to the flange 17. The blade 16, the side section 19, and the bracing section 20 may all be made from a single piece of sheet metal which is bent to the shape shown in Figs. 3, 6, and 8 and then is secured to the blade-supporting flange 17. Each blade is also provided with a bracing flange 22 which is integral therewith and which has its edge 23 bent at right angles thereto to overlie the side face of the blade supporting flange 17, said edge portion 23 being also spot welded or riveted to the flange.

Fig. 5, which is a side view of the cultivating implement 1, shows the location of these soil-stirring blades 16. Each extends from near the periphery of the supporting flange 17 inwardly at an angle to a radial line drawn through the blade. Each blade also extends at right angles to the supporting flange 17 and occupies a plane parallel to the axle 2.

The angular relation of these blades 16 is such that as the cultivator element rolls forward over the earth with the under side of said element sunk into the earth, as shown in Fig. 1, each blade on the advancing side of the cultivator element will come into contact with the earth in substantially a flat or horizontal position, and during continued rolling motion of the cultivator element, each blade, after thus coming flatwise into contact with the earth, is tilted forwardly by the rotary movement of said element, and during said tilting movement the relatively broad leading edge 40 of the blade is thrust downwardly into the earth. The continued rotation of the cultivator element continues the tilting motion of the blade and as the blade moves into a position on the trailing side of the cultivator element it gradually assumes a vertical position, the continued turning movement of the cultivator element withdrawing the blade from the earth while in its substantially vertical position.

This operation of thrusting the relatively broad leading edge 40 of each blade into the earth and tilting the blade forwardly and then withdrawing the blade from the earth serves to loosen and work over the earth or soil.

This operation is illustrated in the diagrammatic view shown in Fig. 7 in which a single blade only is illustrated. The blade-supporting flange is indicated by the circle 17 and during the operation of the machine, the lower portion of each flange will be operating in the soil as illustrated in Fig. 7, the line 15 representing the top surface of the soil.

During the rotation of the cultivator element 1, each blade 16 will come into flatwise engagement with the soil 15 as shown in Fig. 7. As the cultivator element rolls forward and the blade-supporting flange comes into the position indicated at 17a, the blade 16 will have been tilted forward and thrust into the soil as indicated by the dotted line position 16a.

As the cultivator element 1 still continues to roll forward toward the dot and dash line position indicated at 17b, the forward tilting movement of the blade 16 is continued while the blade is in the earth thereby stirring up and loosening the earth, and by the time the cultivator element has reached the position indicated at 17b, the blade will have been carried into a substantially vertical position as indicated at 16b and will have been pretty well withdrawn from the soil.

This is the way in which each of the blades 16 operates on the soil, and since each blade-supporting flange 17 carries a plurality of soil-stirring blades 16, the stirring action of the blades on the soil will be continuous throughout the width of the implement as the latter is moving forward.

The operation of thrusting each blade into the soil and simultaneously tilting it forward serves to loosen the soil, and this operation can be performed with a minimum expenditure of power. My improved cultivator is not only well adapted to perform its intended function of loosening the soil, but its power requirements are relatively low so that it is an implement which anyone can easily handle and manipulate.

In the construction shown the bracing elements 20 function somewhat as auxiliary soil-stirring blades. These bracing elements are so disposed and arranged that as the cultivator element rolls forwardly, they too come into contact with the earth substantially flatwise and during continued rolling movement of the cultivator element each bracing element is thrust into the soil and simultaneously tilted forward thereby assisting in loosening and cultivating the soil.

25 indicates weed cutting blades which are mounted on the frame in front of the cultivator element 1 and which may be used for cutting any weeds in the path of the cultivator element. These blades are each shown as mounted on a stem 26 and the stems in turn are carried by a transverse supporting element 27. The blades 25 are adjustable and they may be set so that they will operate just beneath the surface of the soil or they may be set so that they will have a deeper cultivating action. The transverse supporting member 27 is provided at each end with a head 28 and each side bar 6 is provided with a boss 29 with which the head registers. The bosses and the head are provided with a plurality of apertures 30 into which removable pins or bolts may be placed to hold the supporting member 27 in position. By removing the pins or bolts, the supporting member 7 may be turned about its axis so as to place the blades 25 in different angular positions as illustrated in Fig. 2.

I claim:

1. A rotary hand hoe comprising a frame adapted to be propelled manually, a freely rotatable cultivator element mounted therein and having a rolling motion over the ground to be tilled as the frame is moved forward, said cultivator element having an annular blade-supporting flange occupying a plane at right angles to its axis of rotation, a plurality of soil-loosening blades carried by said flange, each blade extending upwardly from said flange and having substantially the same width from its leading edge to its trailing edge and also occupying a plane parallel to the axis of rotation of the cultivator element with its leading edge located substantially at the periphery of the flange and extending substantially parallel to said axis of rotation, each blade also extending backwardly from its leading edge at an acute angle to a radial line through said edge, and means for bracing each blade comprising a side member rigid with said blade at its outer edge and extending substantially parallel with said flange and a brace member connecting said side member with the flange said blades having such relation to the direction of rotation of the cultivator element as the frame is moved forward that the rotative movement of the cultivator element brings each blade into engagement with the ground in a substantially horizontal position and then tilts the blade forwardly and simultaneously thrusts it into the ground and continunes its tilting movement while it is in the ground till it approaches a vertical position at which time the blade is withdrawn from the ground.

2. A rotary hand hoe comprising a frame, a freely rotatable cultivator element mounted thereon and adapted to be rolled over the ground to be tilled by the forward movement of said frame, said cultivator element presenting a blade-supporting member, a plurality of blades mounted thereon, each blade occupying a plane parallel to the axis of rotation of the blade-supporting member but spaced a considerable distance therefrom and also having a relatively broad leading edge located in said plane and extending parallel to said axis of rotation each blade making an angle of less than 90° with a radial line extending through the leading edge thereof and more than 90° with another radial line extending through the trailing edge thereof, each blade being so positioned on the blade-supporting member that a radial line through the trailing edge of the blade is situated in advance of the radial line extending through the leading edge thereof when considered with respect to the direction of rotation of the blade-supporting member as the cultivator implement is moved forwardly during normal operation thereof, whereby as each blade-supporting member rolls forwardly with the lower side thereof sunk into the earth, the blades on the advancing side of said blade-supporting member will be brought successively flatwise against the earth and during the continued forward rolling movement of said blade-supporting member the broad leading edge of each blade will be forced downwardly into the earth as the blade undergoes a change of position due to the forward rolling movement of the blade-supporting member, each blade being gradually turned into a vertical position as it is withdrawn from the earth on the trailing side of the blade-supporting member during the continued forward rolling movement thereof.

3. A rotary hand hoe comprising a frame, a freely rotatable cultivator element mounted thereon and adapted to be rolled over the ground to be tilled by the forward movement of said frame, said cultivator element having a disk-like blade-supporting member occupying a plane at right angles to the axis of rotation of said cultivator element and a plurality of blades mounted on the blade-supporting member, each blade extending at right angles to the blade-supporting member and having a leading edge and a trailing edge with its leading edge adjacent the periphery of the blade-supporting member and extending substantially parallel to said axis of rotation, each blade also forming an acute angle with a radial line drawn through its leading edge and being so positioned that a radial line extending through the trailing edge is located in advance of the radial line extending through the leading edge when considered with respect to the normal direction of rotation of the blade-supporting member as the cultivator element moves forwardly, whereby during the forward operative movement of said device each blade will be brought flatwise into contact with the earth and will then be pushed forwardly to thrust its leading edge downwardly into the earth, said blade being withdrawn from the earth as the forward rolling movement of the cultivator element brings it into a substantially vertical position, and bracing means connecting the upward edge of each blade with the blade-supporting member.

RAY L. PHIPPS.

REFERENCES CITED

The following references are of record in the file of this patent:

UNITED STATES PATENTS

| Number | Name | Date |
| --- | --- | --- |
| 1,088,038 | Rutledge | Feb. 24, 1914 |
| 1,178,515 | Haldin | Apr. 11, 1916 |
| 1,641,393 | Mackie | Sept. 6, 1927 |
| 1,900,701 | Fisher | Mar. 7, 1933 |
| 2,227,641 | Garey | Jan. 7, 1941 |

FOREIGN PATENTS

| Number | Country | Date |
| --- | --- | --- |
| 55,366 | Germany | Sept. 10, 1912 |